United States Patent [19]

Kambara

[11] Patent Number: 5,749,398

[45] Date of Patent: May 12, 1998

[54] SOLIDIFIABLE FLEXIBLE TUBE

[76] Inventor: Goro Kambara, 13730 Via Encantado, Valley Center, Calif. 92082

[21] Appl. No.: 600,300

[22] Filed: Feb. 12, 1996

[51] Int. Cl.[6] .................................................. F16L 9/18
[52] U.S. Cl. ........................... 138/113; 138/103; 138/114; 138/DIG. 8; 264/295; 264/573
[58] Field of Search ............................. 138/103, 111–115, 138/120, DIG. 8; 264/294, 295, 573

[56] References Cited

U.S. PATENT DOCUMENTS

| | | | |
|---|---|---|---|
| 3,250,297 | 5/1966 | Mooneyham | 138/113 |
| 3,992,505 | 11/1976 | Tally | 264/295 |
| 4,118,162 | 10/1978 | Baumgarten | 264/295 |

FOREIGN PATENT DOCUMENTS

93/22108  11/1993  WIPO ..................................... 138/114

*Primary Examiner*—Stephen F. Gerrity

[57] ABSTRACT

A flexible conduit which utilizes internal spacers and form wires to maintain dimensional integrity during contouring. Once formed into the desired configuration, the system can be made rigid by the injection of pressure into one or more internal elastomeric tubes which expand to solidify the structure. The "fixed" form can then be removed and measurements made for fabricating conforming production pipes and tubes.

19 Claims, 3 Drawing Sheets

SOLIDIFIABLE FLEXIBLE TUBE

BACKGROUND—FIELD OF INVENTION

This invention relates to the bending of tubes, pipes and conduits in accordance with data taken from an archetype which represent the desired production configuration. The information representing the three-dimensional geometry of the model is typically obtained by coordinate measuring machines, the resulting digital description being converted by appropriate algorithms into instructions from which the shape can be reproduced by automatic machine processes.

BACKGROUND—DISCUSSION OF PRIOR ART

The bending of tubes, pipes and conduits in two and three-dimensions to follow a prescribed pathway requires information as to the location, curvature and direction of each bend. In some situations, the knowledge is obtained from drawings and schematics—in other applications, the final configuration may be the result of trial and error experimentation—or the handiwork of an experienced pipe fitter who manually forms a prototype or a final product.

In the greater number of situations however, these processes are carried out using numerically controlled tube bending machines. Data for such operations can be determined by making measurements manually or if an exact model of the tube is available, it may be derived automatically from a coordinate measuring machine. An alternative is to employ a route following coordinate measuring device to store the digital information which corresponds to the desired pathway to be occupied by a later fabricated tube. Such equipment is, however, expensive and cannot be used in all situations because of physical constraints. A practical alternative is to bend a wire to conform with the centerline of the tube from which measurements are taken and extrapolated via standard coordinate measuring devices.

The present invention is concerned with an improved apparatus for overcoming the shortcomings encountered using the bent wire approximation, which is typically a common welding rod having a diameter which is in most cases considerably smaller than that of the actual tube which it simulates. These shortcomings may be epitomized as follows:

(a) The difference between the wire size and tube size requires skilled guesswork and estimates on the part of the technician in assessing the curvature and lengths required to fit the actual tube within the prescribed openings between closely spaced components.

(b) It is difficult to form accurate radial bends in wires by manual means.

(c) Corrections to adjust for errors can result in kinks and curves which introduce additional errors in the measurements.

(d) The lack of a significant cross sectional area can cause errors due to gravitational deflection and/or sag— particularly where the wire is oriented in one position during contouring and measurements are made on a supporting flat surface with a different gravitational orientation.

The aforementioned shortcomings of the solid wire proto-form are alleviated by the present invention which comprises an inexpensive tube simulating cylindered conduit which can be quickly and easily formed into a retainable shape of any desired contour.

Once formed and rigidified the cylindered conduit retains its shape, both during and after its removal from its formation determining environment.

Accordingly, the primary objectives of the invention are:

(a) to provide a cylindered conduit having a size and characteristic such that it may be formed and configured in and within the space which determines the shape to which a functioning tube, pipe or conduit of the same approximate diameter must be bent.

(b) to provide a size range of tube simulating devices each having an intrinsic minimum bend radius associated with a particular diameter so as to prevent the inadvertent formation of a model which cannot be constructed because of physical limitations inherent in the material to be used in making of the functioning device.

(c) to provide a tube simulating apparatus which is pliant and bendable during the configuration phase.

(d) to provide a tube simulating apparatus which can be fixed or firmed into its contoured form so as to permit the making of reliable measurements after its removal.

(e) to provide a reusable tube simulating apparatus.

Other objects and advantages of the invention will be obvious from the detailed description of a preferred embodiment given herein below.

DESCRIPTION OF THE DRAWINGS

FIG. 1-A shows a detailed view of FIG. 1 illustrating the solidifying structure in a flexible state.

FIG. 1-B shows a detailed view illustrating the solidifying structure in a rigid state.

FIG. 1-C shows a detail of the tapered cylindrical wedge used to secure the center wire of the flexible structure.

LIST OF REFERENCE NUMERALS

Reference numerals in drawings

Figure 1:
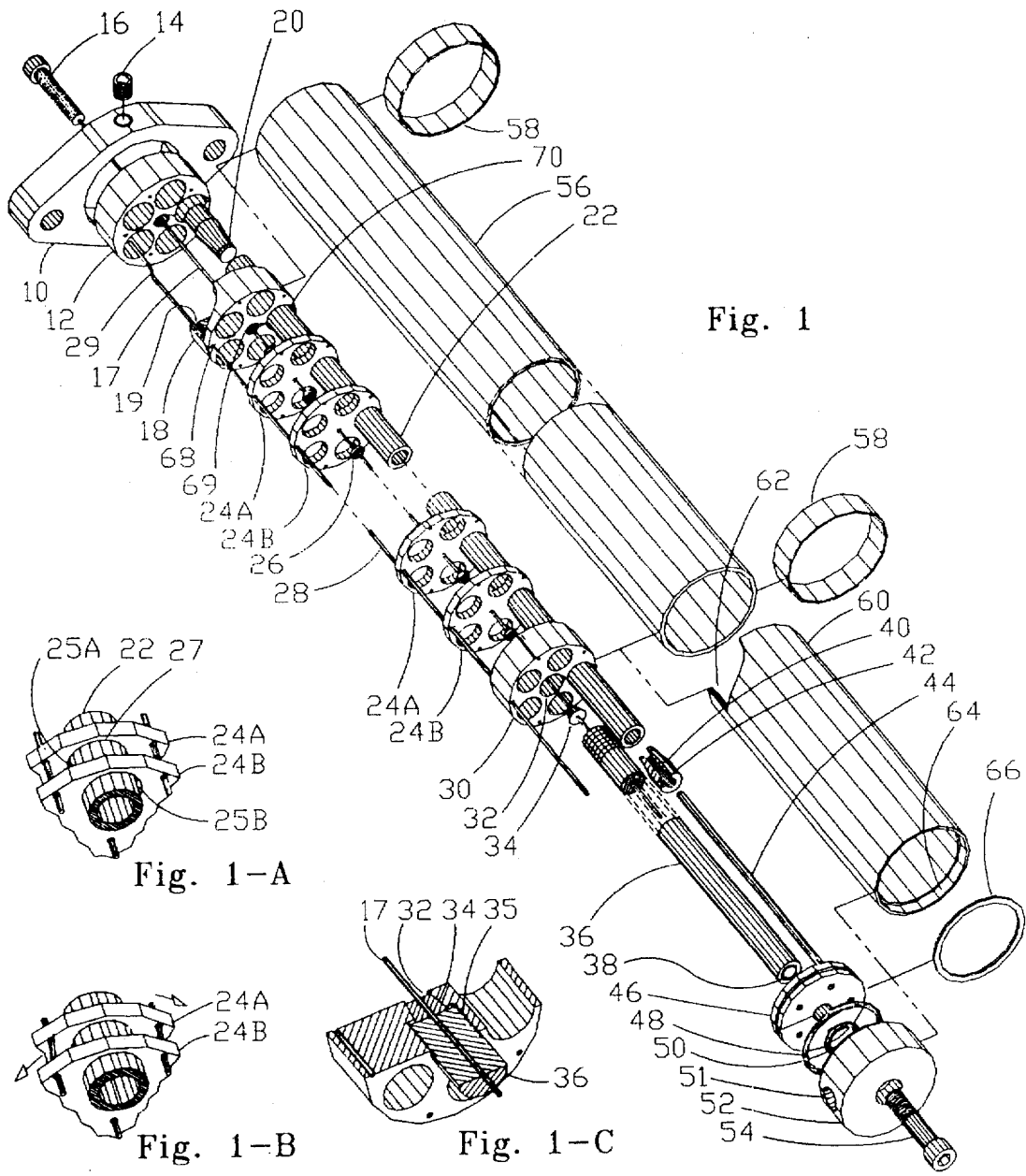
FIG. 1 shows an exploded perspective view of a preferred embodiment of the invention.

| 10 | mounting adapter | 12 | beginning plate | 14 | set screw |
|---|---|---|---|---|---|
| 16 | screw with center hole | 17 | center wire | 18 | retaining plate |
| 19 | recess | 20 | plug | 22 | elastomeric tubing |
| 24a | disc | 24b | disc | 25a | gap |
| 25b | gap | 26 | o ring | 27 | elongated hole |
| 28 | form wire | 29 | kink | 30 | end plate |
| 32 | tapered hole | 34 | tapered circular wedge | 35 | female thread |
| 36 | stem | 38 | female thread | 40 | seal housing |
| 42 | seal | 44 | metal tube | 46 | tube mounting plate |
| 48 | outer seal | 50 | inner seal | 51 | pressure port |
| 52 | pressure port plate | 54 | screw | 56 | flexible cover tubing |
| 58 | hose clamp | 60 | housing | 62 | step |
| 64 | step | 66 | retaining ring | 68 | hole |
| 69 | threaded hole | 70 | hole | 212 | beginning plate |
| 214a | screw | 214b | screw | 215 | serrated part |
| 216 | holes | 217 | recess | 218 | kink |
| 220a | clamp disc | 220b | clamp disc | 222 | elastomeric tubing |
| 224 | linkage | 226 | compression spring | 228 | form wire |
| 230 | end plate | 232a | hose clamp | 232b | hose clamp |
| 234 | flexible tube | 236 | pressure port | 312 | pressure port plate |
| 313 | serrated part | 314a | hose clamp | 314b | hose clamp |

-continued

LIST OF REFERENCE NUMERALS

| | | | | | |
|---|---|---|---|---|---|
| 315 | longitudinal groove | 316 | flexible conduit | 318 | elastomeric tubing |
| 320 | flexible tubing | 322 | form wire | 324 | end plate |
| 326 | guide tube | | | | |

DETAILED DESCRIPTION OF A PREFERRED EMBODIMENT

Adverting to the drawings and particularly FIGS. 1, 1-A and 1-B, there is shown a mounting adaptor 10 for securing the assembly to an external surface (not shown), a beginning plate 12 attached to said mounting plate 10 via a set screw 14, the latter having holes of a size and in a location to accommodate a plurality of individual form wires 28. Beginning plate 12 is counter bored and drilled so as to receive screw 16 which contains a center hole of a size sufficient to secure center wire 17. Center wire 17 can be bent clamped or press fit into the hole in screw 16, so as to prevent it from pulling free when the structure is flexed or shaped. Form wire 28 and center wire 17 are preferably made of piano wire or some similar material which can not be easily permanently deformed.

Beginning plate 12 also contains a plurality of holes which are slightly larger than the diameter of the elastomeric tubings 22, the latter being secured with tapered plugs 20 which form a wedge for securing the ends of the elastomeric tubings 22 to the retaining plate 18 when screw 16 is tightened. More particularly, retaining plate 18 contains a plurality of holes 68 slightly larger than the form wires 28, a threaded center hole 69 for engaging the accordant threads of screw 16; five holes 70 each for accommodating one of the five elastomeric tubes 22, and a recess 19 associated with each of the form wires 28. Tightening screw 16 pulls retaining plate 18 against beginning plate 12 causing form wires 28 to kink into recesses 19 as shown by the sharp jog 29—the latter thus functioning as a means for preventing the form wires 28 from separating from the end assembly comprising beginning plate 12 and retaining plate 18. Retaining plate 18 also secures the five elastomeric tubes 22—the tapered plugs 29 function to expand the five elastomeric tubes against the walls of the five holes 70 as screw 16 is tightened.

The functional objective of the invention is accomplished by the actions and interactions of those elements between the end portions. These elements include a plurality of pairs of discs, so identified as 24a and 24b at any number of points along the longitudinal dimension of the assembly. Each disc contains holes for accommodating both the form wires 28, center wire 17 and five elongated holes 27, one for each of the elastomeric tubes 22. All the holes are of sufficient size so as to permit the wires and tubes to slide and move longitudinally during the flexing and formation process. It will be understood however, that the holes 27 for accommodating the elastomeric tubes are slightly elongated—e.g., they are not perfectly circular. As shown in FIG. 1-A, each pair of discs 24a–24b is face-to-face reversed so that there is a small gap 25a between the left wall of the elongated hole 27 of disc 24a and a small gap 25b between the right wall of the elongated hole of disc 24b. The discs themselves (24a and 24b) are actually identical—but when placed in the reverse face-to-face position they appear as mirror images, that is, disc 24b is the same "part" as disc 24a except that the pair are assembled with corresponding surfaces back to back and front to front, the sequence repeating over the length of the assembly between retaining plate 18 and end plate 30 with O-rings 26 functioning as spacers in-between each disc.

End plate 30 is fabricated with sufficiently sized holes to accommodate form wires 28, and elastomeric tubings 22. Center wire 17 is secured via a tapered circular wedge 34 and an accordant tapered end portion of hole 32 as illustrated in FIG. 1-c. Stem 36 accommodates center wire 17 with a slightly larger hole so as to enable the stem 36 to be moved both axially and rotationally with respect to center wire 17. The non-tapered portion of hole 32 is cylindrical—internally threaded to mate with the male threads of stem 36 so that the screwing of stem 36 into the threaded portion of hole 32 in end plate 30 compresses the tapered circular wedge 34 against the accordant taper of hole 32 thus securing center wire 17 to end plate 30.

Form wires 28 and elastomeric tubings extend through and beyond end plate 30 to provide sufficient extra length to be taken up by the bending and forming of the assembly. The ends of the elastomeric tubes 22 have a pressure seal housing 40 and seals 42 which function to prevent leaks when pressure is applied through the tubes 44. Tubes 44 slide within the seals 42 and seal housing 40 to accommodate the length changes which occur during forming. One end of each tube 44 terminates in the tube mounting plate 46, the holes of which are located to be concentric with the holes in the end plate 30 which accommodate the five elastomeric tubes 22. The distance between end plate 30 and the tube mounting plate 46 is determined by the length of housing 60 which has a recessed step 62 and 64 which allow it to be fit over end plate 30 and tube mounting plate 46—the latter being secured via a retaining ring 66.

Screw 54 passes freely through pressure port plate 52, outer seal 48, inner seal 50 and tube mounting plate 46 to engage with the accordant female threads 38 of stem 36 so as to maintain the assembly together. A cavity between outer seal 48 and inner seal 50 is connected to the metal tubings 44 and pressure port 51 of pressure port plate 52 to form a fluid passage. Flexible cover tubing 56 encompasses the length between retaining plate 18 and end plate 30—being secured by hose clamps 58 as shown. The flexible cover tubing 56 has an inside diameter equal to the outside diameter of retaining plate 18 and end plate 30—but slightly larger than the diameters of the discs 24a and 24b so as to permit internal freedom of movement in conjunction with a smooth outer surface for making machine measurements.

Figure 2:
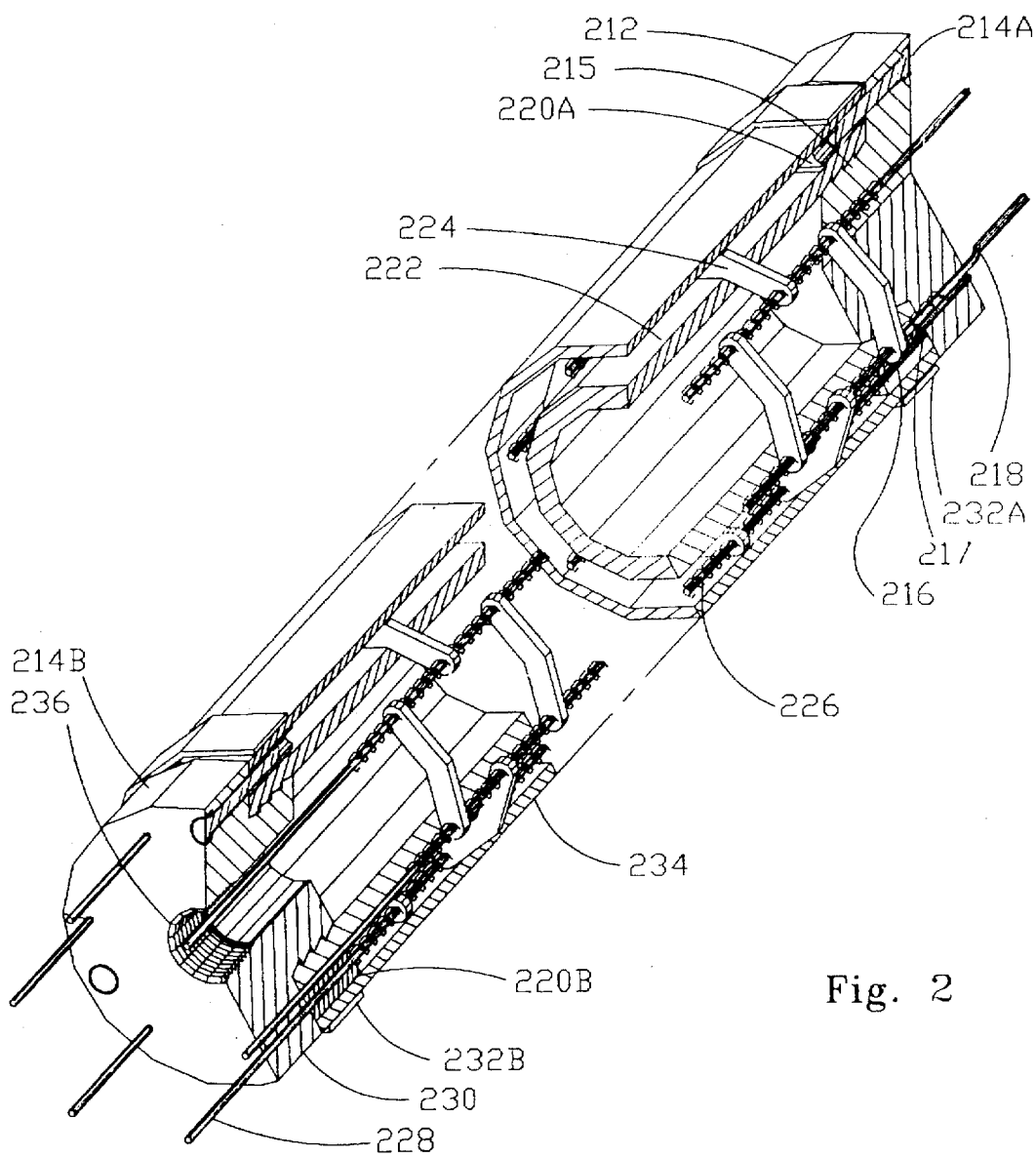
FIG. 2 shows a cutaway perspective view of an alternative embodiment of the invention.

FIG. 2 shows an alternate embodiment of the invention, which comprises; a beginning plate 212 which contains a plurality of holes having a diameter slightly larger than the form wires 228; a serrated part 215 which functions as a plug for cylindrically concentric elastomeric tubing 222; a retaining disc 220a which functions in the dual capacity as a hose clamp and as a guide for form wires 228 via holes 216 spaced in accordance with the location of each of said form wires 228. Tightening screws 214a pulls retaining disc 220a against beginning plate 212 causing form wires 228 to be bent into recess 217 in a manner previously described in connection with the embodiment shown in FIG. 1, the bent kink 218 thus function as before as a means of securing them to beginning plate 212.

Each section of the assembly comprises a set of elements which include six compression springs 226 and three linkages 224 which are outboard of the elastomeric tubing 222 so as to engage form wires 228 as shown. Each section of the assemble is rotated 60 degrees with respect to its adjacent set—the complete group of sets comprising the composite unit between beginning plate 212 and end plate 230.

End plate 230 is nearly identical to beginning plate 212 except it has pressure port 236, and retaining disc 220b is nearly identical to retaining disc 220a except it does not retain form wires 228 but lets them move freely. Form wires 228 extend through end plate 230 a functional distance to accommodate the length differentials caused by the bending of the aforementioned assembly. Flexible cover tube 234 encompasses everything between retaining discs 220a and 220b and fastens to them by virtue of hose clamps 232a and 232b.

Figure 3:
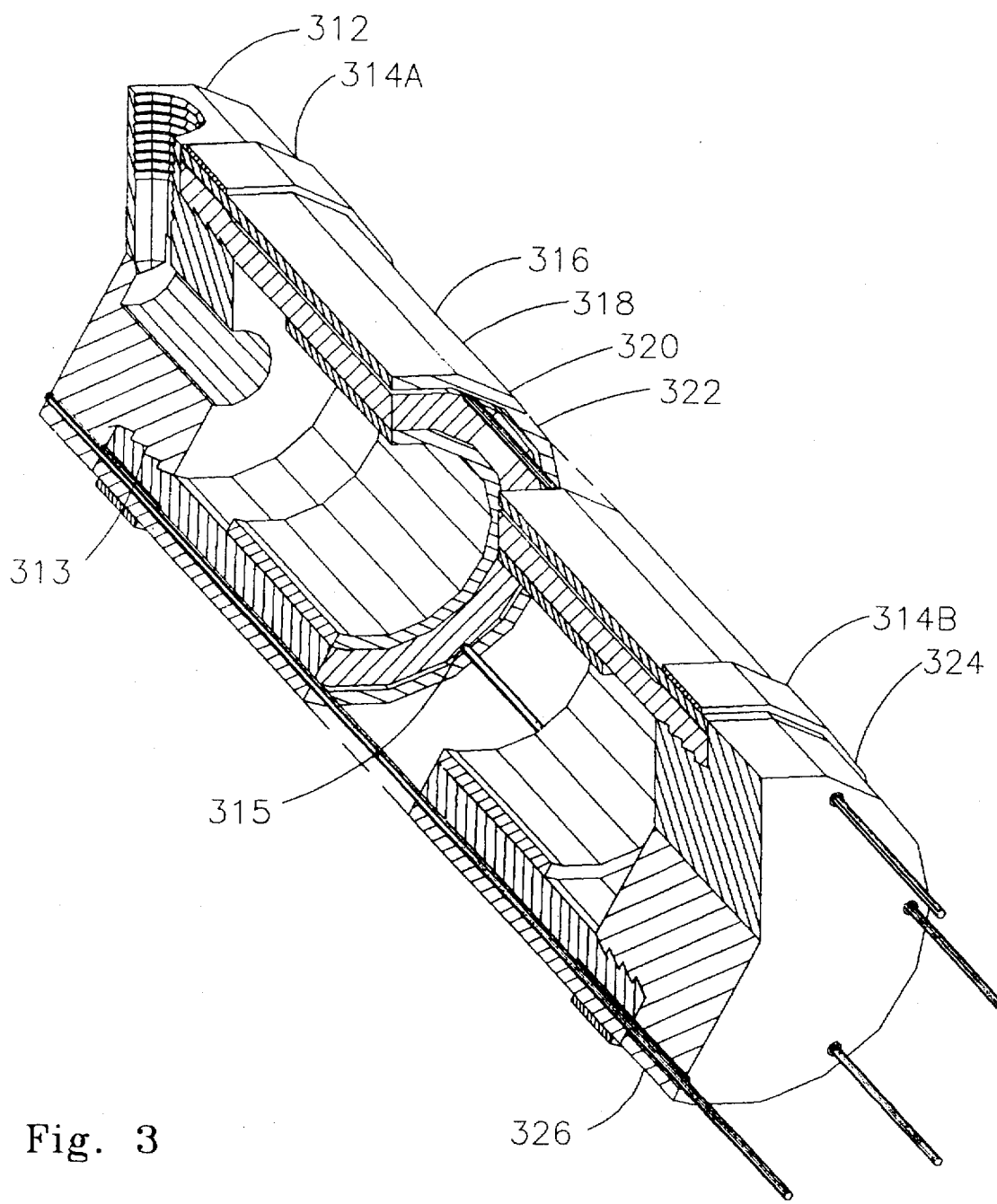
FIG. 3 shows a cutaway perspective view of a second alternative embodiment of the invention.

A third embodiment of the invention is shown in FIG. 3, wherein beginning plate 312 is constructed to secure six form wires 322 as well as elastomeric tubing 318 via its serrated part 313. Elastomeric tubing 318 is formed to have longitudinal groves 315 which are slightly larger than form wires 322, the longitudinal grooves 315 functioning as recessed troughs for mounting the form wires 322 outboard of the elastomeric tubing 318. A flexible tubing 320 is located within the elastomeric tubing 318 in order to prevent the latter's collapse—which would likely dislodge the form wires 322 from the grooves 315—with their consequent dislocation. End plate 324 includes six guide tubes 326 which allow form wires 322 to slide inwardly or outwardly during the forming of the apparatus. Flexible cover tube 316 encloses the entire length of the elastomeric tubing 318— being clamped at both ends over the serrated parts 313 via hose clamps 314a and 314b.

FUNCTIONAL OPERATION

In the embodiment illustrated in FIGS. 1, 1-A, 1-B the mounting adaptor 10 is 1st attached to a mating part (not shown as it forms no part of the invention), and the apparatus is bent and formed to the desired contour, the internal parts functioning to allow the necessary elongations and foreshortenings of the form wires 28 in a manner consistent with the objects of the invention, it being understood that the minimum bend radius is ultimately limited by that which causes the discs 24a and 24b to contact one another at their outer edges. Once the desired shape is completed, fluid is injected from port 51 through the metal tubings 44 and seal housing 40, outer seal 48 and inner seal 50 functioning to prevent fluid leakage as the pressure increases. The magnitude and direction of the bends and their relative orientation determine the excess length of the elastomeric tubings 22 and form wires 28 beyond plate 30—it being understood that seal housing 40 is free to slide with respect to the tubes 44, which are preferably made of metal to most simply facilitate this sliding function. As the pressure builds, the elastomeric tubings 22 expand to occupy the elongated holes 27 causing discs 24a to rotate clockwise and discs 24b to rotate counterclockwise until the action is limited by form wires 28—the final positioning being a rigidly locked relationship between all components as shown in FIG. 1-B, thus maintaining the integrity of the three-dimensional geometry.

In the operation of the embodiment shown in FIG. 2, the fluid pressure is introduced into the elastomeric tubing 222 which expands causing the linkages to go forward by virtue of the fact that these linkages are tied to the form wires 228—thus creating a fixed geometric relationship between all form wires 228 so as to retain the desired shape. In this case, the position of the linkages, being separated with compression springs 222, determine the minimum bend radius since the compression springs 226 cannot be compressed beyond a certain minimum dimension.

In the embodiment shown in FIG. 3, fluid pressure is introduced into elastomeric tubing 318 which expands against the form wires 322 to fix the geometric configuration. Minimum bend radius in this embodiment is determined by the characteristics of the flexible conduit 316—its wall thickness and cross section being the primary limiting factors.

Although the invention has been shown and described utilizing particular embodiments, it will be understood that the invention is not limited thereto, and that numerous changes, modifications and substitutions may be made without departing from the spirit of the invention.

What is claimed is:

1. A solidifiable tube for simulating a contoured conduit comprising:

a cylindrical array of bendable wires;

spacing means for retaining said array of bendable wires so as to allow the individual wires of said array to slide longitudinally with respect to one another;

an elastic cover tube having an inside diameter sufficient to encompass said cylindrical array of bendable wires and an outside diameter of a size to simulate the conduit to be formed from measurements made upon said solidifiable tube;

at least one elastomeric tube within said elastic cover tube;

means for applying pressure to said elastomeric tube so as to cause it to expand within the confines of said elastic cover tube.

2. The apparatus recited in claim 1 wherein said cylindrical array of bendable wires comprise piano wire and wherein said means for applying pressure to said elastomeric tube comprises a pressure port, and further comprising:

connecting means between said pressure port and one end of said elastomeric tube for channeling fluid pressure to that portion of said elastomeric tube which is contained within said elastic cover tube.

3. The apparatus recited in claim 1 further comprising:

a cylindrical array of elastomeric tubes uniformly spaced within the confines of said elastic cover tube;

a beginning plate having a plurality of first sized holes spaced to coincide with the wires comprising said cylindrical array of bendable wires, and having a diameter sufficient to retain said wires with respect thereto, and a plurality of second sized holes spaced to coincide with the elastomeric tubes of said cylindrical array of elastomeric tubes, and having a diameter sufficient to accommodate said elastomeric tubes;

a center wire;

means for securing said center wire to said beginning plate;

means for securing the ends of said elastomeric tubes to said beginning plate, and;

means for plugging the ends of said elastomeric tubes at the place where they join to said beginning plate.

4. The apparatus recited in claim 3 wherein said means for securing the ends of said elastomeric tubes to said beginning plate and for plugging the ends of said elastomeric tubes comprises a plurality of tapered plugs each respectively adapted to fit within the inside diameter of one of said elastomeric tubes so as to form a compression wedge which forces said elastomeric tubes against the walls of the holes in said beginning plate.

5. The apparatus recited in claim 3 wherein said spacing means comprises:

a plurality of pairs of discs, each having at least two different sized holes, said first holes for accommodating said wires of said bendable wire array and said second sized holes for accommodating said elastomeric tubes of said array of elastomeric tubes, said first and second sized holes being spaced to coincide with said cylindrical arrays respectively, said first size holes having a diameter sufficient to permit said wires to slide longitudinally with respect thereto, and said second size holes being elongated so as to form alternating left and right side gaps between said elastomeric tubes and said successive discs.

6. The apparatus recited in claim 5 further comprising:

an end plate having first and second sized holes for accommodating the extra length of said array of wires and elastomeric tubes that is anticipated to be taken up during the forming and bending of the solidifiable tube;

port means for injecting fluid or gas pressure into said elastomeric tube array.

7. The apparatus recited in claim 1 including:

a beginning plate having a plurality of holes of a diameter sufficient to accommodate said bendable wires of said cylindrical array;

means for positioning said elastomeric tube so as to locate said elastomeric tube to be concentric with said cylindrical array of bendable wires.

8. The apparatus recited in claim 7 including:

a plurality of linkage means outboard of said elastomeric tube for engaging said bendable wires;

compression springs adapted to slide on said bendable wires for applying a force to position individually said plurality of linkage means when said solidifiable tube is bent.

9. The apparatus recited in claim 1 including:

means for positioning said elastomeric tube within the area encompassed by said cylindrical array of bendable wires;

a flexible tube positioned within said elastomeric tube.

10. The apparatus recited in claim 9 wherein the outer surface of said elastomeric tube is adapted to have a plurality of longitudinal grooves, each of said grooves having a cross sectional dimension of sufficient size to accommodate one of the individual wires of said array of bendable wires so as to permit said wire to slide longitudinally with respect to said elastomeric tube, and further including:

a beginning plate for securing each wire of said cylindrical array of bendable wires and an end plate having a plurality of guide holes, one for each of said individual wires of said array of bendable wires, each hole having a sufficient diameter so as to permit said individual wires of said bendable array of wires to slide in or out with respect thereto.

11. A flexible conduit which can be bent into a desired configuration and rigidified into a semi-permanent form comprising:

a flexible outer shell having a length commensurate with the total path to be traversed;

spacing means for maintaining the internal cross sectional configuration at each point of the flexible conduit;

means for rigidifying said flexible conduit into a semi-permanent configuration.

12. The apparatus recited in claim 11 wherein said means for rigidifying said flexible conduit comprises:

pressure means for injecting a fluid into the interior of the space encompassed by said flexible outer shell.

13. The apparatus recited in claim 12 wherein said spacing means comprises:

a plurality of discs spaced apart along the length of said flexible conduit so as to retain the internal dimensions at each point when said flexible conduit is bent.

14. The apparatus recited in claim 13 wherein said plurality of discs comprises:

first and second discs oriented face-to-face, and;

a plurality of such pairs of discs spaced apart over the length of said flexible conduit.

15. The apparatus recited in claim 14 further comprising:

a plurality of elastomeric tubes each having a length at least commensurate with the length of said flexible conduit;

a plurality of form wires each having a length at least commensurate with the length of said flexible conduit;

and wherein each of said discs is adapted to have a first plurality of holes of a size sufficient to accommodate said elastomeric tubes and a second plurality of holes of a size sufficient to accommodate said form wires.

16. The apparatus recited in claim 15 wherein said pressure means for injecting a fluid into the interior space comprises at least one of said elastomeric tubes.

17. The apparatus recited in claim 15 comprising:

a plurality of linkages between adjacent pairs of form wires;

compression spring means for maintaining the separation between adjacent linkages over the length of said flexible conduit.

18. The apparatus recited in claim 11 wherein said spacing means comprises an internal elastomeric tube having a plurality of longitudinal grooves, and further including:

a plurality of form wires positioned external to said elastomeric tube, one of each of said form wires to be positioned to occupy one of said grooves in said elastomeric tube, and;

an internal flexible tubing within said elastomeric tube.

19. A method for forming a proto-conduit from which manufacturing data can be obtained, comprising the steps of:

1. positioning a flexible conduit of the type having at least one internal elastomeric tube and spacing means for retaining its internal dimensional integrity when formed to simulate a desired pathway;

2. forming said flexible conduit into the desired contour;

3. injecting pressure into one end of at least one elastomeric tube so as to cause the dimensions of the proto-conduit to be fixed.

* * * * *